(12) United States Patent
Doglioni Majer

(10) Patent No.: US 11,284,737 B2
(45) Date of Patent: Mar. 29, 2022

(54) BEVERAGE DISPENSING MACHINE WITH BREWING CHAMBER HEATER

(75) Inventor: Aldo Doglioni Majer, Milan (IT)

(73) Assignee: Rheavendors Services S.p.A., Como (IT)

(*) Notice: Subject to any disclaimer, the term of this patent is extended or adjusted under 35 U.S.C. 154(b) by 0 days.

(21) Appl. No.: 13/814,687

(22) PCT Filed: Aug. 1, 2011

(86) PCT No.: PCT/IB2011/001797
§ 371 (c)(1),
(2), (4) Date: Aug. 28, 2013

(87) PCT Pub. No.: WO2012/020296
PCT Pub. Date: Feb. 16, 2012

(65) Prior Publication Data
US 2013/0330453 A1    Dec. 12, 2013

(30) Foreign Application Priority Data

Aug. 10, 2010 (EP) .................................. 10425270

(51) Int. Cl.
*A47J 31/44* (2006.01)
*A47J 31/56* (2006.01)
*A23F 5/26* (2006.01)

(52) U.S. Cl.
CPC ............ *A47J 31/4403* (2013.01); *A23F 5/26* (2013.01); *A47J 31/56* (2013.01)

(58) Field of Classification Search
CPC ........ A47J 31/56; A47J 31/44; A47J 31/4403; A47J 31/441; A47J 31/40; A47J 31/5253; A47J 2201/00; A47J 31/00; A23F 5/26
See application file for complete search history.

(56) References Cited

U.S. PATENT DOCUMENTS

| 5,551,331 | A | | 9/1996 | Pfeifer et al. | |
|---|---|---|---|---|---|
| 5,564,331 | A | * | 10/1996 | Song | A23N 12/08 34/225 |
| 5,953,981 | A | * | 9/1999 | Lassota | A47J 31/007 426/433 |
| 6,286,415 | B1 | * | 9/2001 | Leung | 99/288 |
| 6,988,444 | B1 | * | 1/2006 | Pfeifer et al. | 99/286 |
| 2005/0115413 | A1 | * | 6/2005 | Kim | A47J 31/0573 99/279 |
| 2008/0050480 | A1 | * | 2/2008 | Doglioni Majer | 426/231 |
| 2010/0011975 | A1 | * | 1/2010 | Mazzer | A47J 42/54 99/538 |

FOREIGN PATENT DOCUMENTS

| EP | 0948926 | | 10/1999 |
|---|---|---|---|
| EP | 1938720 | * | 7/2008 |

(Continued)

OTHER PUBLICATIONS

EP1938720abstract.*

(Continued)

*Primary Examiner* — Hong T Yoo
(74) *Attorney, Agent, or Firm* — Silvia Salvadori

(57) ABSTRACT

An automatic machine for dispensing beverages, in particular coffee-based beverages, is provided with a forced air means for regulating the temperature of at least one brewing unit.

9 Claims, 3 Drawing Sheets

(56) References Cited

FOREIGN PATENT DOCUMENTS

EP          2133011          12/2009
JP      2002-315677 A        10/2002

OTHER PUBLICATIONS

Office Action dated Aug. 13, 2019 by the Brazilian Patent Office for corresponding BR patent application No. BR112013003282-0 and relevant reporting letter of the local agent summarizing the OA.
Local Agent's letter dated Oct. 19, 2018 reporting an Office Action for corresponding Korean patent application No. 10-2013-7004536.
Office Action dated Oct. 16, 2018 by the Korean Patent Office for corresponding Korean patent application No. 10-2013-7004536.
Office Action dated Oct. 4, 20181331/DELNP/2013 by the Indian Patent Office for corresponding Indian patent application No. 1331/DELNP/2013.

\* cited by examiner

BEVERAGE DISPENSING MACHINE WITH BREWING CHAMBER HEATER

TECHNICAL FIELD

The present invention relates to a beverage machine with brewing chamber heater. In particular, the invention relates to an automatic machine for dispensing coffee and other beverages provided with means to maintain the brewing units and/or dispensing units at the required temperature.

BACKGROUND

Automatic machines for the preparation of beverages, in particular for the preparation of coffee-based beverages, of the type known on the market, have various components which can be grouped according to the function they perform and normally comprising means for the preparation of beverages, brewing means, and dispensing means. The brewing means comprise a brewing chamber made of metal, generally aluminium, or made of plastic, in which a predetermined quantity of coffee, or of another ingredient, is placed. The brewing chamber is then supplied with hot water, maintained under pressure and at a predetermined temperature so that the process for preparation of the beverage is optimal and efficient. A known problem is that of the difference in temperature between the water and the brewing chamber: above all in the first dispensing after a period of disuse of the machine, the water reaching the brewing chamber undergoes a substantial decrease in temperature and does not maintain the temperature necessary to provide an optimal beverage.

Some possible prior art solutions to maintain constant temperature conditions in the brewing chamber and/or in the dispensing unit or units provide for heating systems that employ the circulation of hot water from the boiler or the use of a heat exchanger in the boiler, or that employ electric heating elements in contact with aluminium brewing chambers.

For example, U.S. Pat. No. 5,551,331 describes a machine for the preparation of espresso coffee in which it is possible to control the temperature of the brewing head. Said brewing head is provided with a temperature sensor and with a heating coil which is heated through the use of a heat exchanger immersed in the boiler. When the sensor senses a decrease in the set temperature around the brewing head, the coil is fed with hot water to mantain the brewing head at the predetermined temperature to obtain high quality coffee.

Prior art solutions for direct or indirect heating of the head of the brewing unit and/or of the dispensing units however have some disadvantages. As a matter of fact, they are costly and complex to produce, and in some particular cases it can be difficult to maintain ideal temperature conditions for preparation of the beverage.

Moreover, prior art solutions necessarily require the use of metal brewing chambers, in particular if electric heating elements are used.

An object of the present invention is to solve the aforesaid problems and to provide a machine for dispensing beverages, primarily coffee, and a process that allows a brewing chamber to be maintained at the required temperature autonomously and separately from the other heat production forms present in the machine (pressurized hot water for brewing, etc.) in a simple and inexpensive manner.

Another object of the present invention is to provide a machine for dispensing beverages and a process that allows the temperature of the brewing head or of the dispensing units to be controlled with precision.

Yet another object of the present invention is to provide a machine for dispensing beverages and a process that allows a high quality beverage to be dispensed in the different operating conditions, intermittent or continuous.

SUMMARY

These and other objects are achieved according to the invention through a machine for dispensing hot beverages, in particular coffee, comprising means for regulating the temperature of the brewing unit and/or of the dispensing unit wherein said temperature regulating means are of forced air type.

The present invention also relates to a process for dispensing beverages prepared by a machine wherein the machine comprises temperature regulating means, in particular for heating of at least one brewing chamber in a brewing unit wherein said temperature regulating means are switched on periodically when the temperature of said brewing chamber drops below a reference value.

More in particular, according to the process of the present invention the following steps are performed, not in sequence:
i) feeding coffee or another preparation for beverages to the a brewing chamber;
ii) heating the brewing water;
iii) switching on a forced air temperature regulation system, said switching on being performed constantly, periodically or if the temperature of the brewing chamber and/or of the dispensing unit detected by the control unit through a temperature sensor is below a predetermined value;
iv) pressurizing the hot water through the feed line to the brewing chamber maintained at a predetermined temperature through the force air heating system; and
v) dispensing the beverage.

According to a peculiar aspect of the present invention, the forced air temperature regulating means are in particular forced air heating means and comprise a fan system.

Said fan system is provided with at least one heater, at least one fan, at least one directional duct for the air, and at least one control unit. The heat produced by the heater is distributed by means of the fan and channelled towards the brewing chamber of the brewing unit and/or the dispensing unit through the directional duct. In this way the brewing chamber and/or the dispensing unit are directly warmed up by the forced heated air, said heated air flowing towards the brewing chamber without meeting obstacles on its path. In particular the fan, external to the brewing unit and never in contact with the ground coffee to be brewed, forces the heated air directly on the head of the brewing chamber to keep said head at a predetermined temperature warm enough to guarantee a quality drink.

In a preferred embodiment, a least one temperature sensor is provided to detect, directly or indirectly, the temperature of the brewing chamber and, if necessary, switch on the heater accordingly.

As mentioned above, the air heater can also be switched on constantly, regardless of the temperature of the brewing chamber, during the operating hours of the dispensing machine. The steps mentioned above are performed when the machine is operating. In the hours in which the machine is not used, for example during the night, the heater remains switched off, in a manner known in the art, e.g. by a suitably programmed control unit.

According to another embodiment, the heater is switched off at least during the brewing step, or while the beverage is being dispensed.

Preferably, the heater is an electric heating element.

According to yet another aspect, the control unit switches on and off the heater and the fan together or separately, as a function of the temperature measured by the sensor. In the preferred embodiment according to the invention, the heater and the fan are switched on simultaneously to produce a flow of hot air adapted suitable for heating the brewing chamber in the brewing unit and/or the dispensing unit. However, the fan can also be switched on alone, without the use of the heater, when it is necessary to lower the temperature, for example in the case of overheating.

According to an advantageous aspect, brewing and dispensing of the beverage takes place at an optimal temperature.

According to another advantageous aspect, heating of the brewing and/or dispensing unit takes place through a heater of small dimension, simple construction and negligible consumption. Due to the features mentioned, the fan heating system is very suitable also for mounting on pre-existing beverage machines.

According to a further advantageous aspect, the fan of the heating system can also be used for cooling in the event of any increase in temperature above those predetermined for the various components.

The invention has numerous advantages with respect to prior art. The forced air system is sturdy, inexpensive and reliable, can be mounted with the electric part separate from the dispensing unit by means of a partition and allows the use of a plastic, or thermoplastic, brewing chamber.

Convection heating allows problem-free heating of plastic material, which is not possible in a conduction system, where physical contact between the heating element and the brewing chamber is required. Contact between a heating element and a plastic part would cause deformation of the plastic part before it can be heated. A further advantage is offered by the possibility of using the fan alone, without switching on the heating element.

BRIEF DESCRIPTION OF THE DRAWINGS

Further features and advantages of the present invention will be more apparent from the following description, provided by way of non-limiting example with reference to the accompanying drawings, wherein.

DETAILED DESCRIPTION OF THE INVENTION

Figure 1:
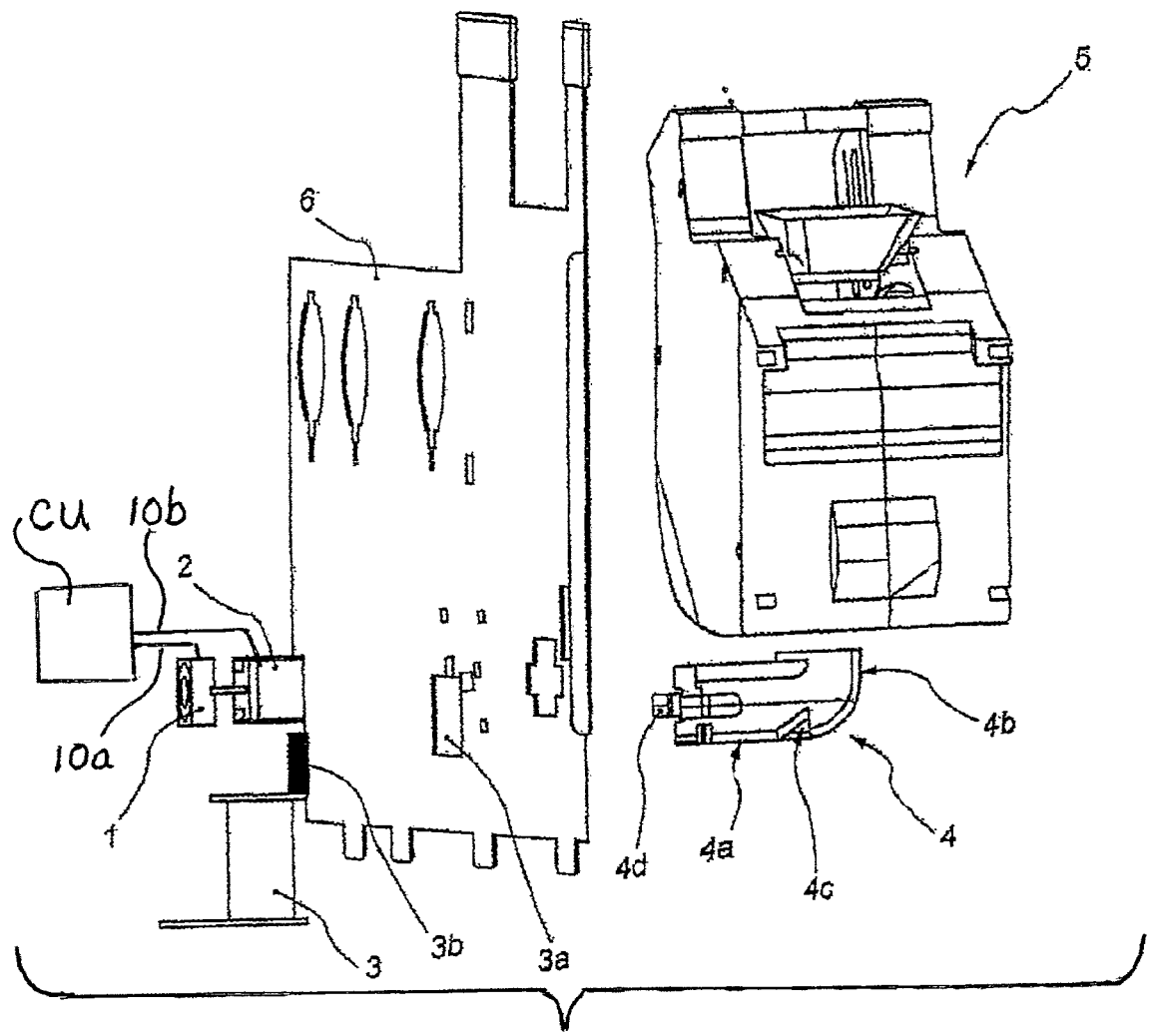
FIG. 1 is an exploded perspective view of the air heating means and of the brewing chamber of the brewing unit before assembly.
Figure 2:
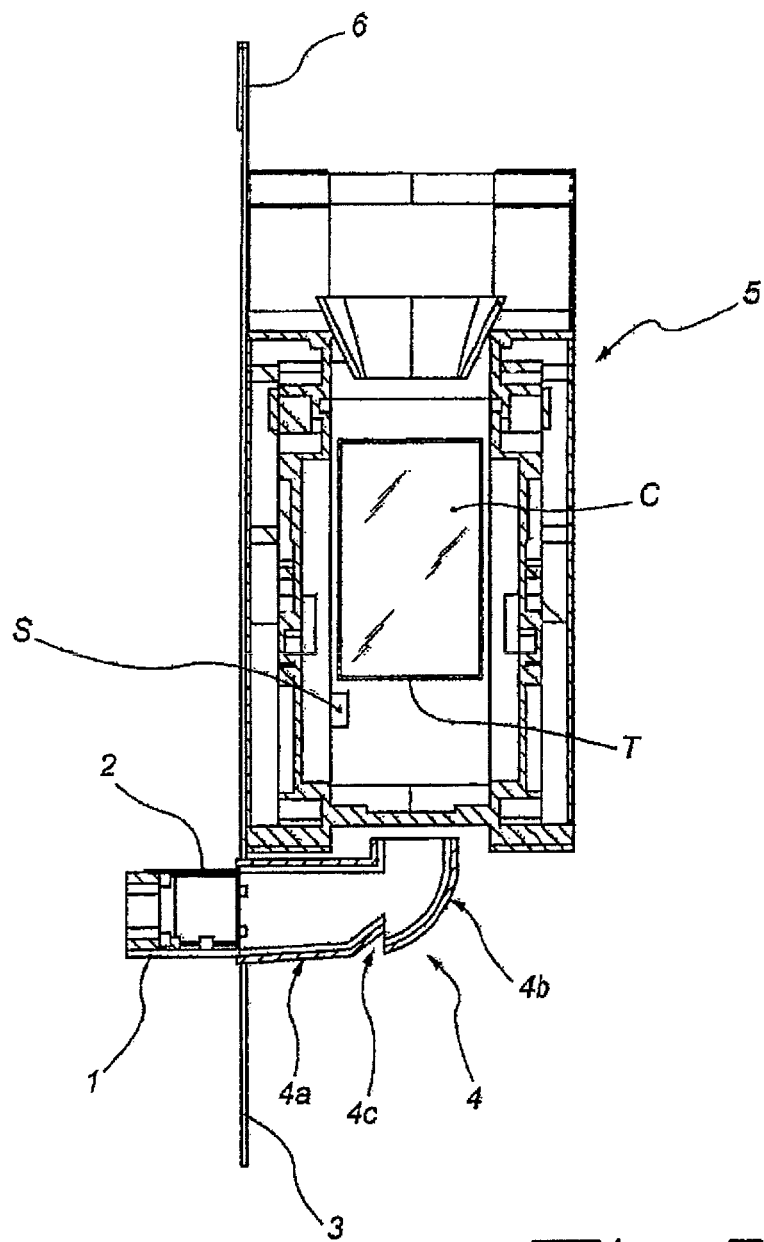
FIG. 2 is a longitudinal sectional view of the air heating means and of the brewing chamber of the brewing unit of FIG. 1 during assembly.
Figure 3:
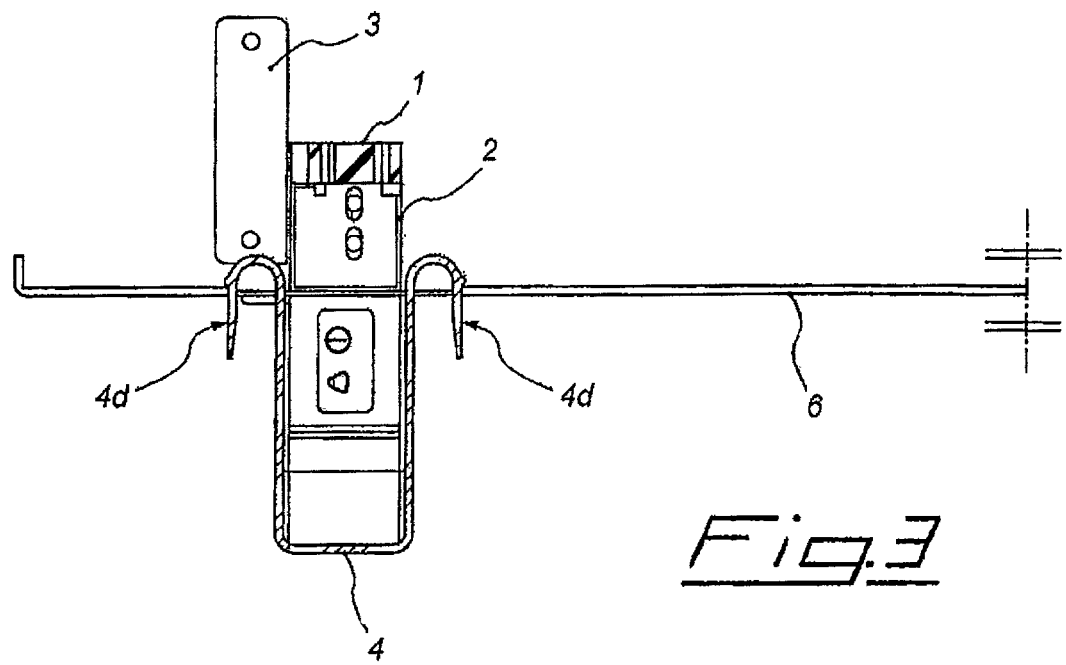
FIG. 3 is a cross sectional view of the forced air heating means of FIG. 1.

FIGS. 1 and 2 represent the fan heating system of a beverage machine according to a preferred embodiment of the invention.

The machine (not shown) includes a fan heating system comprising at least one heater 2, at least one fan 1, at least one directional duct 4 for the air, at least one support 3 for the heater 2, at least one temperature sensor S and at least one control unit CU that communicates with the heater 2 and the fan 1 via appropriate conductors 10a and 10b.

The system is preferably mounted in connection with a partition support 6 present inside the machine which separates the area housing the components suitable for the preparation and distribution of the coffee (such as the brewing unit 5) from the area housing the components for the preparation of hot water and/or steam.

Said partition support 6 is provided with openings to place the two environments in communication. In particular, it is provided with an opening 3a suitable for passage of the hot air produced by the heater 2 and thrust by the fan 1.

The heater 2, is positioned on a support 3 provided with screen 3b and connected to the base of the machine, is connected to the fan 1 on the opposite side to the side connected to the partition support 6. A directional duct 4 is used to orient the flow of hot air produced by the heater 2 with the fan 1 toward the brewing chamber C of the brewing unit 5. Said hot air duct 4 is adapted to channel the hot air produced by the fan system toward the brewing chamber C in the brewing unit 5 so as to maintain this latter at a temperature that is higher than room temperature and possibly constant. Therefore, the heated air flows and directly hits against the brewing chamber C so to keep said brewing chamber, in particular the chamber head T, at a predetermined temperature warm enough to guarantee a quality drink. In fact, one of the problems encountered in prior art beverage machines is the difficulty in maintaining the brewing chamber in the brewing unit and/or the dispensing unit at an optimal temperature for the production of a high quality beverage.

Between dispensing of one beverage and the next, above all if the machine is used intermittently and not continuously, the brewing chamber C of the brewing unit 5 and in particular the brewing head T, i.e. the lower part of the brewing unit facing the duct 4, cools down and drops to a lower temperature with respect to the optimal temperature for the preparation of beverages. The pressurized hot water supplied for the production of beverages can be subject to, above all at the brewing head T of the brewing chamber C, a drop in temperature to below the ideal brewing temperature (preferably around 70°-80° C.) resulting in a decrease in the quality of the beverage. This problem is particularly intensified during winter months.

The machine with the fan heating system of the type mentioned according to the invention instead maintains the brewing chamber C of the brewing head 5, and in particular the brewing head T, at a constant temperature, conveying the heat produced by the heater 2 towards this latter through the duct 4. Said heater 2 is preferably an electric heating element with low absorbed power (i.e. 20-60 Watt, preferably between 20 and 40 Watt) and a flow rate in the range between 4 and 7 mc/h, preferably a flow rate of around 4.8-5.5 mc/h, more preferably of 5.1 mc/h. The maximum output temperature of the heater is preferably in the range between 40° C. and 50° C.

In one embodiment, in addition to the control unit, the machine according to the invention is also provided with a temperature sensor S which is preferably placed in proximity of the chamber C of the brewing unit 5 and in particular close to the brewing head T.

The control unit CU monitors the temperature of the chamber of the brewing unit 5 through the temperature sensor S and activates the heater 2 and the fan 1 when said temperature drops below the temperature predefined as optimal to obtain a high quality beverage. This allows the brewing chamber to be maintained at the required temperature using forced air autonomously and separately from the other heat production forms present in the machine (pressurized hot water for brewing, etc.) in a simple and inexpensive manner. Normally, said temperature predefined as optimal is in a range of between 70 and 80° C. The brewing chamber and/or the dispensing unit are directly warmed up by the forced heated air, said heated air flowing towards the brewing chamber without meeting obstacles on its path. In particular the fan, external to the brewing unit and never in contact with the grounded coffee to be brewed, forces the heated air directly on the head of the brewing chamber so to keep said head at a predetermined temperature warm enough to guarantee a quality drink.

Figure 4:
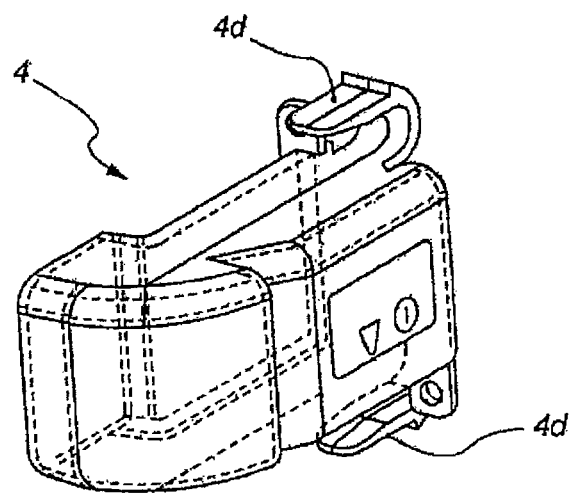
FIG. 4 is a perspective view of the air conveyor of FIG. 1.

The heater 2, which is preferably an electric heating element, in particular a resistor, with low absorbed power but sufficient to heat the air required to maintain the brewing chamber C of the brewing unit 5 at the required temperature, is switched on by the control unit CU which simultaneously activates the fan 1 thus producing a flow of hot air which is directed toward the brewing head T of the brewing chamber C of the brewing unit 5 through the directional duct 4. Said directional duct 4 is preferably produced in the form of a parallelepiped with quadrangular cross section, with a horizontal part 4a and a curved end connector 4b oriental towards the brewing head, as shown in FIG. 4.

The horizontal part 4a of the directional duct is provided, in the vicinity of the end connector 4b, with an opening 4c adapted to allow removal of any residual products of coffee, water or other products that can fall into the duct during the brewing process. The directional duct 4 is connected to the partition support 6 in a manner known in the art, for example through snap fitting into the opening 3a and locked in a releasable manner to said partition through tabs 4d.

Alternatively to the position below the unit 5, the heater 2 can also be positioned at the side or even above the brewing chamber C. In the case of being positioned at the side, the duct 4a and 4b is absent or has smaller dimensions.

In the above mentioned embodiments, the flow path of the heated air from the fan till the brewing chamber and/or dispensing unit, is free of interfering obstacles, like ducts, shields and interface surfaces to guarantee a direct heating of said brewing chamber and/or dispensing unit.

The fan temperature regulating system can also be used to maintain the dispensing units at the required temperature so that if necessary the temperature of said units can also be regulated according to the characteristics of the beverage to be dispensed.

Moreover, according to an advantageous aspect of the machine according to the invention, the fan of the temperature regulation system can also be activated separately without necessarily being connected to the heater. This could be useful in the cases in which it becomes necessary to reduce any overheating.

A machine of the present invention may be used in a process for dispensing beverages prepared by a machine wherein the machine comprises temperature regulating means, in particular for heating of at least one brewing chamber in a brewing unit wherein said temperature regulating means are switched on periodically when the temperature of said brewing chamber drops below a reference value. According to a process of the present invention the following steps are performed, not in sequence: feeding coffee or another preparation for beverages to a brewing chamber; heating the brewing water; switching on a forced air temperature regulation system, said switching on being performed constantly, periodically or if the temperature of the brewing chamber and/or of the dispensing unit detected by the control unit through a temperature sensor is below a predetermined value; pressurizing the hot water through the feed line to the brewing chamber maintained at a predetermined temperature through the force air heating system; and dispensing the beverage.

The invention claimed is:

1. A machine for dispensing beverages including coffee-based beverages, comprising
a brewing chamber enclosed in a brewing unit said brewing chamber having an outer surface and comprising a brewing chamber head; and
means for regulating temperature of said chamber head of said brewing chamber, wherein said temperature regulating means comprises at least one duct said duct being detached and spaced apart from the brewing chamber for directing an unobstructed flow of heated air to directly hit against the outer surface of said chamber head of the brewing chamber to keep the chamber head of said brewing chamber at a predetermined temperature, the temperature regulating means further comprising a fan and an electric heating element, and at least one temperature sensor placed in proximity of said chamber head to detect, directly or indirectly, the temperature of the chamber head of the brewing chamber, said machine for dispensing beverages further comprising at least one control unit to control operations of said electric heating element and of said fan wherein said control unit switches on or off the electric heating element and the fan together or separately.

2. The machine for dispensing beverages according to claim 1, wherein said electric heating element has a power between 20 and 40 Watt.

3. The machine for dispensing beverages according to claim 1, wherein said brewing chamber is made of plastic.

4. The machine for dispensing beverages according to claim 1, wherein said control unit switches on or off the electric heating element and the fan as a function of the temperature measured by the sensor with respect to a predetermined reference value.

5. The machine for dispensing beverages according to claim 1, wherein said electric heating element and said fan are laterally separated from said brewing unit by a partition.

6. The machine for dispensing beverages according to claim 1, wherein said brewing chamber contains coffee grounds and water.

7. A machine for dispensing beverages including coffee-based beverages, comprising a brewing chamber enclosed in a brewing unit and spaced apart from a base of the brewing unit; and means for regulating temperature of said brewing chamber, wherein said temperature regulating means comprises at least one duct spaced apart from the brewing chamber for directing an unobstructed flow of heated air directly against an outer surface of the brewing chamber to keep said brewing chamber at a predetermined temperature, the temperature regulating means further comprising a fan and an electric heating element.

8. The machine for dispensing beverages according to claim 7, wherein the temperature regulating means further comprises at least one temperature sensor to detect, directly or indirectly, temperature of the brewing chamber.

9. The machine for dispensing beverages according to claim 7, wherein the temperature regulating means further comprises at least one temperature sensor to directly detect temperature of the brewing chamber.

* * * * *